Feb. 1, 1955 — J. H. BOOTH — 2,701,151
JOINT ASSEMBLY
Filed April 10, 1951
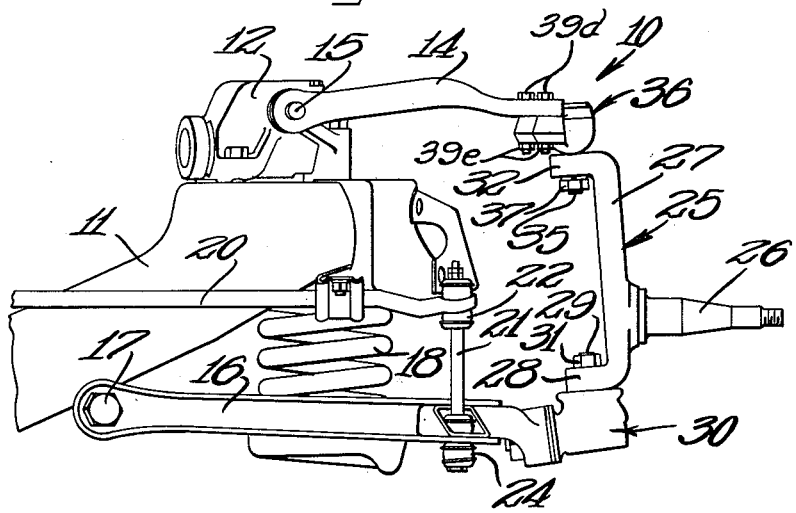
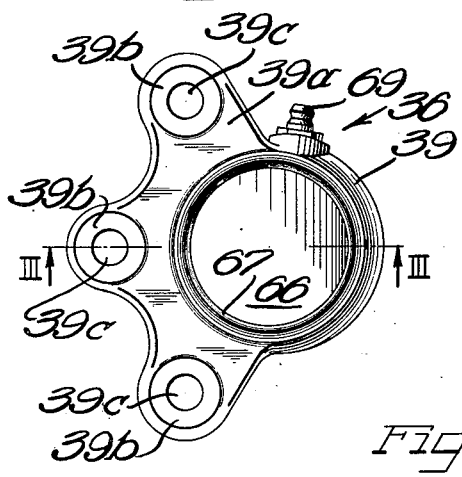
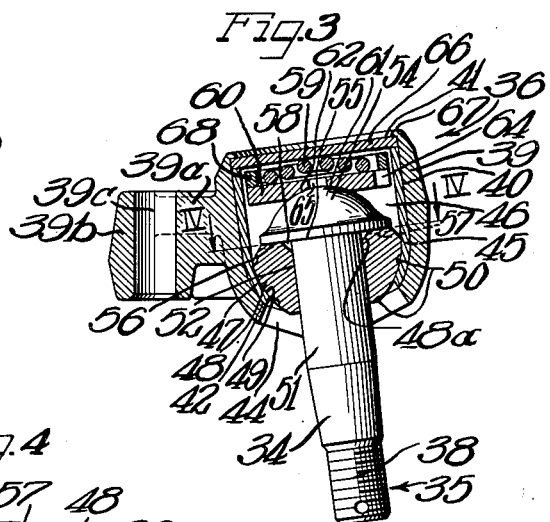
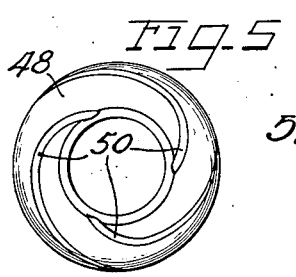
Inventor:
James H. Booth United States Patent Office 2,701,151
Patented Feb. 1, 1955

2,701,151
JOINT ASSEMBLY

James H. Booth, Venice Township, Shiawassee County, Mich., assignor to Thompson Products, Inc., Cleveland, Ohio, a corporation of Ohio Application April 10, 1951, Serial No. 220,260

4 Claims. (Cl. 287—90)

This invention relates to an improved joint assembly, and more particularly to an improved joint assembly of the controlled friction damping type for use in an independent steerable wheel suspension.

The joint assembly of the present invention is intended for use for pivotally connecting the steering knuckles to the upper control arms in an independent steerable wheel suspension to dampen shimmy or wobbling of the front wheels of a vehicle as the wheels roll along a road. As clearly pointed out in my U. S. Patent No. 2,521,335, issued September 5, 1950, independent ball joint type automotive wheel suspensions have been known for some time, but prior to my invention the ball joint type wheel suspensions were not put into general commercial use because of the wheel shimmy or wheel kick problem, among others. The problem of controlling wheel kick has been solved by utilizing anti-friction load-carrying ball joints for connecting the steering knuckles to the lower control arms or load-carrying arms while utilizing controlled-friction shimmy-damping type ball joints for pivotally connecting the steering knuckles to the upper control arms of the wheel suspension.

The joint assembly of the present invention is of the shimmy-damping type and contains several improvements over other ball joints of this particular type. According to this invention, a controlled vibration-damping friction is provided between an annular bearing face formed on the underneath side of an integral head on a steel stud and an annular end bearing face formed on a bearing ring formed of powdered metal or steel having the required frictional characteristics. The proper predetermined damping friction between these abutting bearing surfaces is insured by the provision of a biasing spring urging a bearing washer against a spherical end face of the stud head which, in turn, urges the damping bearing surfaces into bearing contact with a predetermined force. The seating force can be varied by providing compression springs of varying strength in order to induce the required amount of damping for the particular application. An even, constant controlled friction is further insured between the damping bearing surfaces by providing crisscrossed lubricant channels or grooves along the surface of the bearing ring damping face to provide an adequate and evenly distributed lubrication between the mating damping surfaces. These lubricant grooves also provide paths for introducing lubricant into a small annular lubricant chamber to supply the mating cylindrical bearing surfaces on the stud shank and the interior of the bearing ring.

The bearing ring is disposed in conforming bearing contact with a segmental spherical bearing surface within the joint interior provided by a hardened steel shell liner which also acts as a spacer to properly position a housing end cap to retain the compression spring and the remainder of the components in the housing.

It is, therefore, an object of the present invention to provide an improved joint assembly.

Another object of the invention is to provide an improved joint assembly of the controlled-friction shimmy-damping type for use in an independent steerable wheel suspension for a vehicle.

A further object of the invention is to provide an improved shimmy-damping type of ball joint in which the rotational bearing surfaces impart a predetermined damping effect to rotation of a joint stud.

Still another object of the present invention is to provide a joint assembly of the controlled-friction shimmy-damping type including means for substantially increasing the useful life of the tilting bearing surfaces in an inexpensively produced joint housing.

A still further object of the invention is to provide a dual-bearing type of ball joint including improved means for retaining a coil biasing spring and for preventing complete flattening of the spring.

A specific object of the invention is to provide an improved dual-bearing ball joint of the controlled-friction shimmy-damping type with means for insuring constant frictional characteristics between a joint stud and a bearing ring and means resiliently urging the bearing surfaces into bearing contact with a predetermined force, said last-mentioned means including a spacing shoulder provided by the end of a hardened insert liner to properly space a retainer cap.

Other objects, features and advantages of the present invention will be apparent from the following detailed description of one embodiment, by way of preferred example only, taken in conjunction with the accompanying drawings.

On the drawings:

Figure 1 is a fragmentary front elevational view of a steerable independent vehicle wheel suspension utilizing a joint assembly according to the present invention for connecting the steering knuckle to the upper control arm;

Figure 2 is an enlarged top plan view of the improved joint assembly shown in Figure 1;

Figure 3 is a sectional view taken along line III—III of Figure 2 and showing the joint stud in elevation;

Figure 4 is a sectional view taken along line IV—IV of Figure 3 and showing the damping bearing face of the bearing ring in elevation to illustrate the pattern of the lubricant grooves formed thereon; and Figure 5 is a plan view of the bearing ring provided in accordance with the teachings of the present invention.

As shown on the drawings:

In Figure 1 is illustrated an independent steerable wheel suspension 10 for an automobile or the like. The end portion of a cross frame member 11 has a shock absorber 12 fixedly mounted on the upper surface of the outer end thereof. An upper control arm 14 is pivotally and operatively connected at its inner end portion to the shock absorber 12, as at 15. A lower control arm or load-carrying arm 16 is pivotally mounted to the lower frame member 11 at a point below the shock absorber 12 by means of a bolt 17. A coil support spring 18 is disposed between the end portion of the cross frame member 11 and the load-carrying arm 16 to resiliently transfer the weight of the vehicle body from the frame member to the load-carrying arm. A torsion rod 20 has its end portion connected to the lower control arm 16 by means of a link 21 and respective attachment portions 22 and 24.

For transferring the weight of the vehicle body from the load-carrying arm 16 to the road, a steering knuckle 25 is herein shown as having an integral wheel support spindle 26 for rotatably receiving a steerable vehicle road wheel (not shown). Said steering knuckle 25 has an integral spindle support portion 27 provided with a lower boss 28 for attachment by means of a nut 31 to the stud 29 of a lower anti-friction load-carrying ball joint 30. The stud 29 is tiltable and rotatably retained within the ball joint 30, and the housing portion of the ball joint is fixedly secured to the outer end of the lower control arm 16.

An upper attachment boss 32 of the spindle support portion 27 has a tapered aperture therethrough (not shown) for fixedly receiving the mating tapered portion 34 (Figure 3) of an upper ball joint stud 35, which is titltably and rotatably retained in a dual-bearing controlled-friction shimmy-damping ball joint 36 embodying the present invention. The tapered shank portion 34 is retained in the mating tapered hole by means of a nut 37 threadedly received on an externally threaded end portion 38 of the stud 35.

In order to fixedly secure the ball joint 36 to the end of the upper control arm 14, there is provided a ball joint housing or casing 39, preferably formed of forged steel, having an integral outwardly extending attachment ledge or flange 39a formed with three spaced integral attachment lugs or bosses 39b having bolt apertures 39c therethrough substantially perpendicular to the ledge. Bolts 39d extend through the bolt aperture 39c and aligned bolt apertures (not shown) in the end portion of the upper control arm 14 and are fixedly secured therein by means of nuts 39e to provide a rigid attachment between the upper control arm and the ball joint 36.

The ball joint casing 39 is of roughly cylindrical configuration with an axial cylindrical bore or chamber 40 formed therein. A substantially diametral opening 41 is provided at the upper end of the chamber 40, while the lower defining walls of the chamber are deformed radially inwardly to provide an annular segmental spherical surface 42 at the lower end portion of the chamber to provide a reduced diameter opening 44 at the lower end of the housing.

To insure a long-wearing tilting bearing surface while still allowing the use of the housing 39 in its tough forged unhardened state, a hardened bearing shell liner 45 is pressed into the chamber 40 in conforming contact with the defining walls thereof and the segmental spherical surface 42 to form a resultant inner cylindrical chamber 46 and an inner hardened segmental spherical bearing surface 47.

To accommodate universal tilting of the stud 35 relative to the housing 39, an annular bearing member 48, formed of steel or powdered metal such as American Electro Metal Corporation "Sinteel G," is provided with an outer segmental spherical bearing surface 49 in conforming bearing contact with the insert bearing surface 47. As may be seen from a consideration of Figure 5, the annular bearing ring 48 is provided with a plurality of spiral grooves 50 formed in the surface thereof to form lubricant channels between the two mating spherical bearing surfaces 47 and 49. The stud 35 has an integral cylindrical shank portion 51 extending into the housing with a portion of the shank in conforming bearing contact within a cylindrical bore 52 formed through the bearing ring 48.

In order to retain the stud 35 against downward movement relative to the housing 39 and to provide mating shimmy-damping bearing surfaces having predetermined frictional characteristics, an integral head 54 is formed at the upper end of the stud cylindrical shank 51. Said head has a plane bearing surface 55 on its undersurface at right angles to the cylindrical shank 51. A mating plane bearing surface 56 is provided on the upper end face of the bearing ring 48.

It should be noted that the damping surfaces 55 and 56 are very important to the proper operation of the wheel suspension in order that the starting friction and the running friction between the surfaces be substantially constant. The surfaces are hardened as by case hardening to preserve the smooth finish and to make them more wear-resistant.

To insure a constant, even frictional engagement between the damping surfaces 55 and 56, two pairs of crisscrossed lubricant channels or grooves 57 are formed across the surface 56 with the two pairs at right angles and the grooves providing lubricant paths between the casing inner chamber 46 and the mating cylindrical surfaces of the cylindrical shank 51 and the bearing ring 48.

A small lubricant reservoir 58 is provided between the bearing surfaces 52 and 56 of the bearing ring 48 by means of an annular notch or chamfer 48a.

Means are provided for resiliently urging the mating damping surfaces 55 and 56 into proper bearing contact with a predetermined force to further insure the necessary damping effect. Herein such means comprise a coil compression spring 59 of frusto-conical configuration which urges a bearing washer or spring seat 60 against the stud head 54 with a semi-spherical end face 61 of the stud head received in conforming relation in a segmental spherical cavity or dimple 62 formed in the center of the seat 60.

The controlled friction between the mating damping surfaces 55 and 56 can be easily varied to vary the damping effect by providing compression springs with different loading forces, a higher loaded spring producing more damping, and vice versa.

In order to provide for proper lubrication of the spring 59 and the mating spherical bearing surfaces 61 and 62, a lubricant path notch 64 is provided in the outer peripheral portion of the seat 60, and a central lubricant aperture 65 communicates between the upper surface and the dimple 62 of the seat.

To provide a closure for the housing aperture 41 and to retain the various components within the housing in proper spaced relation, a closure disk or cap 66 is inserted in the aperture 51 against the upper annular end of the insert sleeve 45, which affords a spacing abutment shoulder to properly position the closure disk 66 relative to the other components of the joint assembly. The cap 66 is fixedly retained against the end of the insert 45 by peening or spinning the upper edge portion of the housing 39 radially inwardly to form an annular clamping flange 67. The closure cap 66 retains the compression spring 59 against upward movement and provides a base against which the spring acts to urge the spring seat 60 downwardly.

For preventing complete collapsing of the spring 59 and for centering the same axially, an annular stop ring or spacer 68 is provided about the spring in spaced relation between the cap 66 and the spring seat 60. The height of the spacer 68 is greater than the diameter of the wire forming the spring 59 so that the spacer will prevent complete collapse of the spring to substantially lengthen the useful life of the same. Ordinarily, a working clearance is provided between the ends of the spacer and the opposing cap 66 and spring seat 60.

In order to provide means for introducing lubricant such as grease or the like into the interior chamber 46, a lubricant fitting 69 communicates through the side wall of the housing 39 and the adjacent side wall of the insert 45 above the bearing ring 48 and below the bearing seat 60.

The mating bearing surfaces within the joint assembly are made considerably more wear-resistant by complete hardening or case hardening of the bearing surfaces of the stud 35, the bearing ring 48 and the bearing seat 60.

From the above description, it will be readily understood that the present invention provides an improved ball joint assembly for use in an independent steerable wheel suspension for connecting the steering knuckle to the upper control arm to dampen wheel kick or shimmy. The damping effect is provided between flat mating bearing surfaces on the stud and the bearing ring with these members formed of selected materials chosen both for their wearing qualities and their frictional characteristics. Dual function lubricant grooves are provided in the bearing ring damping faces to insure a lubricated, constant friction engagement between the damping bearing surfaces and to provide lubricant paths for lubricating the stud shank. Other features of the joint assembly are the use of a relatively heavy spring seat disk for mating with the round head of the stud, a separable spacer ring to prevent collapse of the spring, and a hardened insert sleeve insuring long wear together with increased housing strength while affording an abutment spacing shoulder for a closure disk.

It will be understood that modifications and variations may be effected without departing from the scope of the novel concepts of the present invention.

I claim as my invention:

1. In an independent steerable wheel suspension, a controlled-friction shimmy-damping ball joint comprising a casing with a chamber formed therein, an annular case-hardened bearing ring universally rockably disposed in said chamber and having a flat annular end face with a plurality of lubricant grooves formed therein in crisscross relation, each of said grooves leading from the outer periphery of said annular bearing member to the inner periphery thereof, a hardened steel stud rotatably disposed in said bearing ring and having an integral head with a flat hardened annular surface in bearing contact with said bearing ring annular end face and substantially coextensive therewith, said bearing ring having a plurality of spiral lubricant grooves in the outer periphery thereof to lubricate the surfaces upon which said bearing ring rocks, and means resiliently urging said head against said bearing ring to induce a predetermined constant damping friction between said abutted flat, hardened, annular face and surface.

2. A controlled-friction shimmy-damping ball joint for use in an independent steerable wheel suspension, comprising a casing having a chamber therein with a segmental spherical surface at one end portion, an annular case-hardened bearing ring having a segmental spherical outer surface slidably disposed against said chamber segmental spherical surface and a cylindrical bore through the ring, said bearing ring having a flat annular end surface with a plurality of lubricant grooves communicating thereacross and having a frusto-conical chamfer formed between said cylindrical bore and said end surface, a hardened steel stud having a cylindrical shank portion rotatably disposed in said cylindrical bearing ring bore and an integral head with a flat annnular surface in bearing contact with said bearing ring end surface, said chamfer and said stud cylindrical and flat annular surfaces defining an annular lubricant reservoir between the stud and the bearing ring, means resiliently urging said stud head against said bearing ring to induce a constant predetermined damping friction between the abutted flat annular surfaces, and means through which lubricant may be introduced into said chamber, whereby part of the lubricant passes through said grooves into said annular reservoir to lubricate said stud cylindrical shank.

3. In an independent steerable wheel suspension, a controlled-friction shimmy-damping ball joint comprising a hollow casing, a stud having a headed portion disposed in said casing, hollow means tiltably and rotatably supporting said stud in said casing, said stud having a segmental spherical end face, a bearing washer having a segmental spherical cavity therein in abutted bearing relation with said stud head spherical face, said washer having a central lubricant aperture therethrough and a separate side lubricant passing opening, a closure member fixedly disposed in said casing hollow outwardly of said stud head, a coil compression spring operatively disposed between said closure member and said washer to resiliently urge the same against said stud head, stop means disposed about said spring and associated with said washer and said closure member for preventing collapse of said spring, and means through which lubricant may be introduced into the hollow in said casing, whereby part of the lubricant passes through said lubricant opening to lubricate said spring and to supply lubricant to said washer central aperture to lubricate the washer and stud head spherical bearing face.

4. In a controlled-friction shimmy-damping ball joint for use in an independent steerable wheel suspension, an annular case-hardened metal bearing ring comprising an outer segmental spherical bearing surface having a plurality of spiral lubricant grooves formed thereacross, an axial cylindrical bore formed therethrough, a flat annular end face at right angles to said cylindrical bore and having two pairs of straight spaced lubricant grooves scored therein with the pairs at right angles, and a frusto-conical chamfer formed between said cylindrical bore and said flat end face, a stud passing through said bore and having an integral head having an annular bearing surface lying coextensive with and in frictional engagement with said end face, said annular head face and said chamfered end face combining to provide an annular grease reservoir for maintaining a constant source of lubricant between said stud and the bearing ring.

References Cited in the file of this patent

UNITED STATES PATENTS

| | | |
|---|---|---|
| 1,683,756 | Blache | Sept. 11, 1928 |
| 2,054,082 | Hufferd | Sept. 15, 1936 |
| 2,071,341 | Hufferd | Feb. 23, 1937 |
| 2,110,148 | Gross | Mar. 8, 1938 |
| 2,122,655 | Niles | July 5, 1938 |
| 2,124,034 | Hufferd | July 19, 1938 |
| 2,147,815 | Hufferd | Feb. 21, 1939 |
| 2,206,972 | Niles | July 9, 1940 |
| 2,388,950 | Booth | Nov. 13, 1945 |
| 2,507,087 | Booth | May 9, 1950 |
| 2,521,335 | Booth | Sept. 5, 1950 |
| 2,544,583 | Booth | Mar. 6, 1951 |
| 2,544,584 | Booth | Mar. 6, 1951 |
| 2,614,873 | Booth | Oct. 21, 1952 |